Jan. 12, 1971  S. J. MARKBREITER ET AL  3,553,972
CRYOGENIC RECOVERY OF HYDROGEN FROM AMMONIA SYNTHESIS GAS
Filed Nov. 19, 1968

INVENTORS
STEPHEN J. MARKBREITER
IRVING WEISS

BY Paul W. Farbo
AGENT

United States Patent Office 3,553,972
Patented Jan. 12, 1971

3,553,972
CRYOGENIC RECOVERY OF HYDROGEN FROM AMMONIA SYNTHESIS GAS
Stephen J. Markbreiter, Edison, N.J., and Irving Weiss, Brooklyn, N.Y., assignors to American Messer Corporation, New York, N.Y., a corporation of New York
Filed Nov. 19, 1968, Ser. No. 776,959
Int. Cl. F25j 3/00, 3/06
U.S. Cl. 62—18
12 Claims

ABSTRACT OF THE DISCLOSURE

The recovery of ammonia and hydrogen-enriched gas from ammonia synthesis purge gas at high pressure may be achieved without the use of external refrigeration. The purge gas is cooled to nearly the freezing point of ammonia to condense and thus separate ammonia from the purge gas. The refrigeration for condensing ammonia is produced by work-expanding the purge gas after ammonia condensate has been removed therefrom. Thereafter, the purge gas is further cooled so that gaseous impurities such as methane and argon are condensed and separated to leave a hydrogen-enriched gas suitable for recycling to the ammonia synthesis. The refrigeration for condensing the gaseous impurities is produced by work-expanding the product hydrogen-enriched gas.

BACKGROUND OF THE INVENTION

Figure 1:
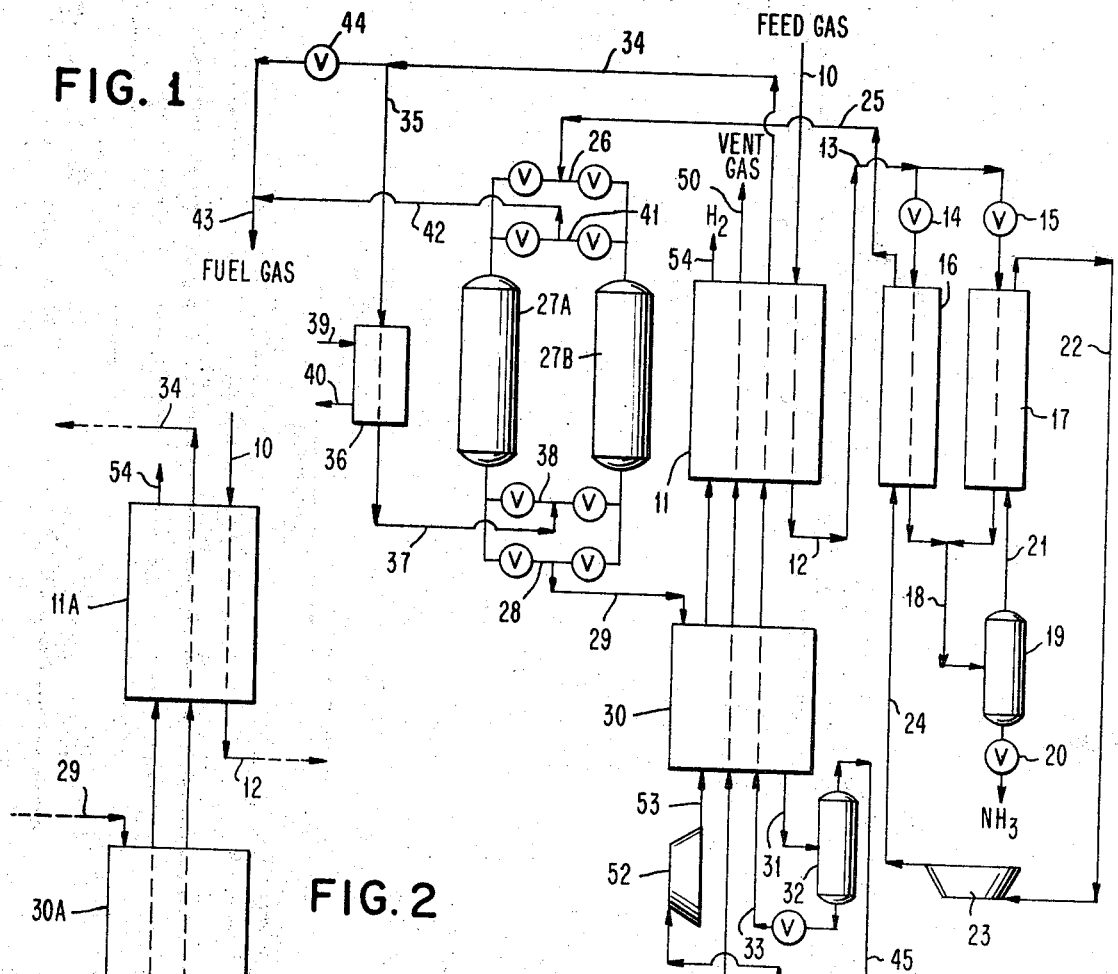

This invention relates to the recovery of ammonia and hydrogen-enriched gas from the purge gas of an ammonia synthesis operation. More particularly, ammonia is liquefied to effect its separation and inert gases are then liquefied to effect their elimination, all of the required refrigeration being produced in two stages by the work-expansion of a gas stream in the recovery process.

The gas stream leaving the catalytic reactor of an ammonia synthesis plant is usually cooled to ambient temperature, generally not exceeding about 100° F. Ammonia condensate formed during this cooling is separated but the remainder of the gas stream still has an appreciable content of ammonia vapor. For example, such gas stream at a pressure of 2000 p.s.i.g. (pounds per square inch gauge) contains approximately 5% by volume of ammonia vapor.

In a prior process, such gas stream is cooled with external refrigeration to a temperature of about −20° F. to effect further condensation of ammonia. After separating this additional ammonia condensate, the gas stream at a pressure of 2000 p.s.i.g. still contains about 2% by volume of ammonia vapor which is then eliminated by scrubbing the gas stream with water. Finally, the washed gas stream is dried before it is cryogenically processed to remove inert gases such as methane and argon. This is an expensive operation particularly in view of the cumbersome recovery of ammonia from the scrubbing water.

For the purposes of this invention, the term, ammonia synthesis purge gas, shall mean the gas stream from the catalytic reactor after it has been cooled to ambient temperature or even to about −20° F. and any ammonia condensate formed during such cooling has been separated therefrom.

Accordingly, a principal object of this invention is to recover ammonia and hydrogen-enriched gas from ammonia synthesis purge gas without the use of a scrubbing liquid to separate and recover ammonia therefrom.

A further object is to recover a fuel gas containing methane from the purge gas.

These and other objects and advantages of the invention will be evident from the description which follows.

SUMMARY OF THE INVENTION

In accordance with this invention, ammonia synthesis purge gas at high pressure is cooled to a temperature short of the freezing point of ammonia to condense as much as possible, generally at least about 90%, of the ammonia present and thus permit the separation of liquid ammonia from the purge gas. After the separation of the ammonia condensate, the purge gas is partially expanded, i.e., expanded to an intermediate pressure, with the performance of sufficient work to produce substantially all of the refrigeration required for the condensation of ammonia. The small amount of residual ammonia vapor in the expanded purge gas, approximately 0.1% to 0.2% by volume for purge gas that was originally at a pressure of 2000 to 3500 p.s.i.g., is eliminated by contacting the expanded purge gas with a suitable adsorbent, liquid or solid, so that the purge gas will then contain not more than a trace of ammonia, i.e., not exceeding 5 parts of ammonia per million parts of purge gas. A solid adsorbent such as a molecular sieve is preferred. The substantially ammonia-free purge gas is further cooled to condense at least about 80%, preferably at least about 90%, of the methane and argon in the purge gas. To achieve the condensation of such a large proportion of these inert gases, the purge gas is cooled to a temperature at which a large portion of the nitrogen in the purge gas is simultaneously condensed with the methane and argon. After separating condensed methane and argon containing nitrogen, the remaining hydrogen-enriched gas containing generally at least about 85% by volume, frequently at least about 90% by volume, of hydrogen is expanded with the performance of sufficient work to produce the remainder of the refrigeration required by the process. Both the expanded hydrogen-enriched gas and the previously expanded purge gas are passed in countercurrent heat exchange relation to incoming purge gas to transfer their cold content to the purge gas and thus effect the aforesaid condensation of ammonia and inert gases.

Modern processes for the synthesis of ammonia are generally conducted by contacting a catalyst with an appropriate mixture of hydrogen and nitrogen at a pressure of at least about 2000 p.s.i.g. The reaction gases are cooled to condense and separate ammonia therefrom, and unreacted hydrogen and nitrogen are recycled to the reactor containing the synthesis catalyst. Inasmuch as hydrogen as produced on a large commercial scale includes at least traces of carbon monoxide and dioxide, methane is simultaneously synthesized with ammonia. Also, nitrogen separated from air includes at least traces of argon which is inert in the catalytic synthesis of ammonia. Hence, as the reaction gases are continuously recycled to the catalytic reactor the content of methane and argon can build up sufficiently so that the efficiency of the ammonia synthesis will drop to an uneconomic level. However, before such a condition arises, a portion of the recycled reaction gases is withdrawn from the process as purge gas at a rate that will prevent the further build up of inert gases, principally methane and argon, in the recycled reaction gases. Of course, the feed mixture of hydrogen and nitrogen is added to the portion of the reaction gases recycled to the catalytic reactor to replace both the amount of hydrogen and nitrogen consumed in the catalytic reactor and the amount of hydrogen and nitrogen discarded from the ammonia synthesis plant as purge gas.

It is from such purge gas generally at a pressure of at least 2000 p.s.i.g that this invention simply and economically recovers both residual ammonia and hydrogen-enriched gas that may be returned to the ammonia synthesis plant for utilization of its hydrogen and nitrogen content. The recovered hydrogen-enriched gas may also be utilized in other hydrogenation processes such as the hydrogenation of oil or coal. While the purge gas of some ammonia synthesis processes may be at a pressure as high as about 5000 p.s.i.g. and may be supplied to the process of this invention at such elevated pressure, it is usually preferable to reduce the pressure of the purge gas to the approximate range of 2000 to 3500 p.s.i.g. before supplying it to the process in order that less costly process equipment may be used. The delivery pressure of the product hydrogen-enriched gas depends on the ammonia content of the purge gas supplied to the process. For example, purge gas at a pressure of 2000 p.s.i.g. and with an ammonia content of 2% by volume treated by this process delivers hydrogen-enriched gas at a pressure of at least 400 p.s.i.g. Generally, the recovered hydrogen-enriched gas has a pressure of at least about 100 p.s.i.g.

It is a feature of the invention that the major portion, generally at least about 80%, of the refrigeration required by the process is produced at a temperature near the freezing point of ammonia and only the remaining minor portion of the required refrigeration is produced at a substantially lower temperature.

DECRIPTION OF PREFERRED EMBODIMENTS

Figure 2:
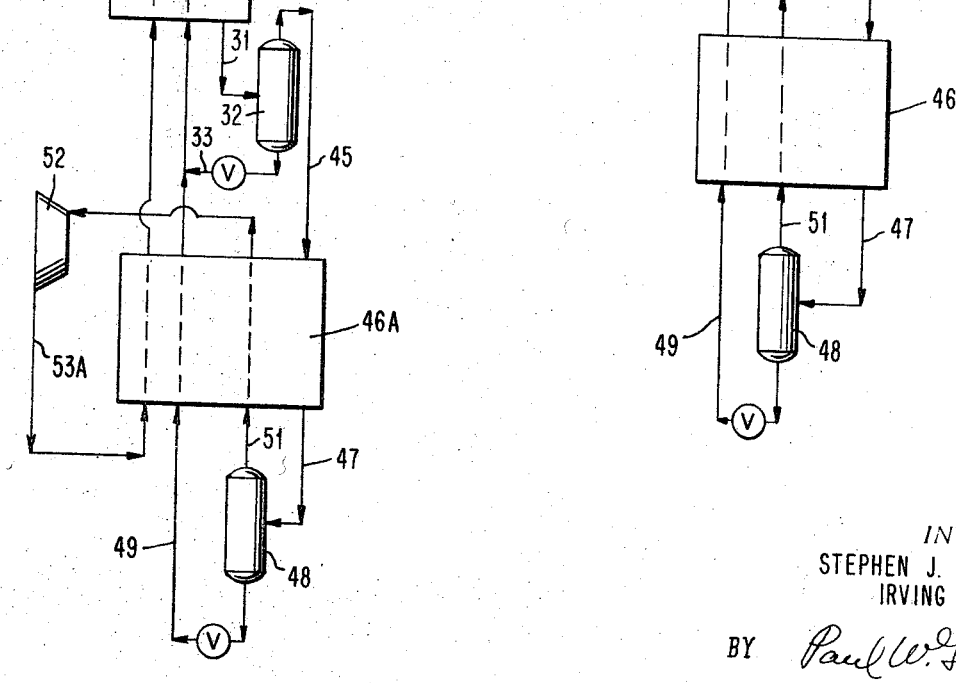

In order that the invention will be more fully understood, the accompanying drawing shows FIG. 1 and FIG. 2 which are flow diagrams of illustrative embodiments of the invention.

Referring to FIG. 1, the purge gas of an ammonia synthesis plant of which the major portion is hydrogen, a minor portion is nitrogen and still smaller portions are methane, argon and ammonia provides the feed gas flowing in line 10 through heat exchanger 11 wherein the feed gas is cooled by the countercurrent streams of the gaseous fractions thereof hereinafter described. The cold feed gas passes from heat exchanger 11 through line 12 to manifold 13 which supplies valved lines 14, 15 that extend through heat exchangers 16, 17, respectively. The feed gas, divided in the desired proportions by valved lines 14, 15, after being further cooled in heat exchangers 16, 17 to a temperature slightly warmer than the freezing point of pure ammonia, passes as a recombined stream through line 18 into separator 19. Condensed ammonia is removed from the cold feed gas and the recovered liquid ammonia is wthdrawn from separator 19 through valved line 20. The feed gas containing a small residual amount of ammonia leaves separator 19 through line 21 and flows through heat exchanger 17 in countercurrent relation to the part of the feed gas that was further cooled therein.

The feed gas with the residual ammonia and partially warmed in heat exchanger 17 flows through line 22 and expander 23 wherein it is partially expanded with the performance of work to provide part of the refrigeration required by the process. The partially expanded feed gas passes by way of line 24 through heat exchanger 16 in countercurrent relation to the part of the feed gas that was cooled therein to effect condensation of ammonia. The partially expanded feed gas passes from heat exchanger 16 through line 25 to double valved manifold 26 which is connected to a pair of adsorbers 27A, 27B that are filled with a suitable adsorbent for ammonia, such as a molecular sieve. Double valved manifold 28 is connected to the opposite end of adsorbers 27A, 27B and serves to pass the feed gas, now with only a trace of ammonia, by way of line 29 to heat exchanger 30. By opening the left valves of manifolds 26, 28 and closing the right valves thereof, the feed gas flows through adsorber 27A. When the adsorbent in adsorber 27A requires regeneration, the left valves of manifold 26, 28 are closed and the right valves are opened so that the feed gas is diverted to flow through adsorber 27B.

The feed gas is cooled in heat exchanger 30 to effect condensation of the major portion of its methane content and is discharged by line 31 into separator 32. The condensate of methane, including some argon, nitrogen and hydrogen, is discharged from separator 32 through valved line 33 with a reduction of pressure that effects revaporization of this liquid phase. The stream of line 33, which is useful as a fuel gas of moderate pressure, passes through heat exchangers 30, 11 to transfer its refrigeration to the countercurrent flow of feed gas. The thus warmed fuel gas leaves heat exchanger 11 through line 34.

At least part of the fuel gas is advantageously used to regenerate the spent adsorbent in adsorbers 27A, 27B. Accordingly, fuel gas in line 34 is passed through line 35, heated in heat exchanger 36 and conducted through line 37 to double valved manifold 38. A circulating stream of heating fluid such as high pressure steam is supplied by line 39 to heat exchanger 36 and withdrawn by line 40.

Assuming that the feed gas is passing through adsorber 27A, then the right valves of manifolds 38, 41 are open so that heated fuel gas flows through adsorber 27B and desorbs ammonia from the spent adsorbent therein to effect its regeneration. When the adsorbent in adsorber 27A has become spent and that in adsorber 27B has been regenerated, the closed right valves of manifolds 26, 28 are opened while their open left valves are closed, and simultaneously the closed left valves of manifolds 38, 41 are opened while their open right valves are closed. Thus, the feed gas is made to flow through adsorber 27B and the fuel gas through adsorber 27A. Obviously, when adsorber 27B needs regeneration, the valves of the four manifolds 26, 28, 38, 41 are set in their original positions so that feed gas again passes through adsorber 27A and fuel gas through adsorber 27B. Fuel gas discharging from manifold 41 flows through line 42 into line 43 which conveys the fuel gas to a desired location for utilization. Valve 44 in line 34 may be controlled to discharge part of the fuel gas directly into line 43.

Returning to the partially expanded feed gas from which the major part of its methane content has been removed in separator 32, the feed gas continues by way of line 45 to flow through heat exchanger 46 wherein the feed gas is finally cooled to condense the major part of the argon remaining therein after some argon was removed as liquid in separator 32. Simultaneously, a substantial amount of nitrogen condenses. The feed gas leaving heat exchanger 46 flows through line 47 into separator 48 wherein condensed argon together with some methane, nitrogen and hydrogen is separated and withdrawn through valved line 49.

The nitrogen-rich liquid in line 49 is expanded through its valve and passed successively through heat exchangers 46, 30, 11 in countercurrent relation to the feed gas to transfer its refrigeration to the feed gas. The stream thus warmed leaves heat exchanger 11 through line 50 as vent gas discharged into the atmosphere.

The hydrogen-enriched gas containing nitrogen together with small amounts of argon and methane is passed from separator 48 by line 51 through heat exchanger 46 to expander 52. After being partially warmed in heat exchanger 46 by the countercurrent flow of feed gas, the hydrogen-enriched or product gas is expanded with the performance of work in expander 52 to produce the remainder of the refrigeration required by the process, the other part of the refrigeration having been produced in expander 23. The product gas expanded in expander 52 is passed by line 53 through heat exchangers 30, 11 in countercurrent relation to the feed gas which receives the refrigeration of the product gas. Hydrogen-enriched product gas at elevated pressure is withdrawn through line 54 and returned for utilization to the ammonia synthesis plant which yields the feed gas for the process just described and shown diagrammatically in FIG. 1. Alternatively, the hydrogen-enriched product gas may be advantageously utilized in a hydrogenation process such as the hydrocracking of heavy oil. For such purpose, the feed gas may be cooled in heat exchanger 46 to a temperature approaching the freezing point of nitrogen so that a greater amount of nitrogen is condensed and the product gas is thus further enriched in hydrogen.

FIG. 2 illustrates a modification of the process of FIG. 1 wherein the gaseous impurities condensed and separated after the first work-expansion of the purge gas are withdrawn as a single gas stream and the refrigeration produced by the second work-expansion of the product hydrogen-enriched gas is more efficiently utilized by passing the expanded product gas in indirect heat exchanger relation with the purge gas in the final cooling stage for the condensation of argon in the purge gas. Because of these variations, heat exchangers 11A, 30A of FIG. 2 have one less gas passageway than corresponding heat exchangers 11, 30 of FIG. 1, while exchanger 46A has one more passageway than exchanger 46.

More particularly, FIG. 2 differs from FIG. 1 in that valved line 49 after passing through heat exchanger 46A discharges into line 33 so that the argon-containing nitrogen-rich stream of line 49 is combined with the methane-containing stream in line 33. Also, the hydrogen-enriched gas leaving expander 52 first flows by way of line 53A through heat exchanger 46A before being passed through heat exchangers 30A, 11A and being recovered as product gas from line 54.

While FIG. 2 incorporates two differences when compared with FIG. 1, other flow diagrams of the process may embody only one or the other of these two differences because they are not dependent on one another.

EXAMPLE

As a specific example of the process of FIG. 1, an ammonia synthesis purge gas having the composition, expressed in percentage by volume:

Hydrogen _____ 67.28
Nitrogen _____ 22.43
Argon _____ 2.12
Methane _____ 6.20
Ammonia _____ 1.97 enters line 10 at a pressure of 2100 p.s.i.g. (pounds per square inch gauge) and a temperature of 75° F. After initial cooling in heat exchanger 11, the purge gas, divided in approximately equal streams, is further cooled in heat exchangers 16, 17 to −100° F., a temperature slightly warmer than the freezing point of ammonia. At least 90% of the ammonia in the purge gas is recovered as the condensate withdrawn through line 20. The purge gas is then reheated in exchanger 17 to a temperature of approximately −30° F. and expanded in turbo-expander 23 to a pressure of about 665 p.s.i.g. and a temperature of about −105° F. The major part of the refrigeration required by the process is produced in this first expansion which delivers about 89% of the total horsepower generated by the process. This refrigeration is sufficient to effect the desired condensation of ammonia. The expanded gas flows through exchanger 16 and passes at a temperature of −20° F. to adsorbers 27A, 27B wherein residual ammonia in the purge gas is decreased to about 1 part per million.

After the adsorption of ammonia, the purge gas is further cooled in heat exchanger 30 to a temperature of −278° F. so that about 76% of the methane and about 41% of the argon present in the purge gas are condensed and separated in separator 32. This condensate also contains some nitrogen. The condensate passes through the valve in line 33 and through exchangers 30, 11, and after being used at least in part to regenerate adsorbers 27A, 27B issues from line 43 as a fuel gas at a pressure of 60 p.s.i.g. and a temperature of about 100° F. with an average composition, expressed in percentage by volume:

Hydrogen _____ 6.91
Nitrogen _____ 47.84
Argon _____ 6.30
Methane _____ 37.69
Ammonia _____ 1.26

The purge gas leaving separator 32 is further cooled to a temperature of −310° F. at which an additional 20% of the methane and 38% of the argon together with about 48% of the nitrogen originally present in the purge gas are condensed and removed in separator 48 along with some hydrogen. The condensate from separator 48 passes through the valve in line 49 and through exchangers 46, 30, 11, issuing from line 50 as vent or discard gas at substantially atmospheric pressure and a temperature of about 35° F. The combined methane and hydrogen content of the vent gas is only 19% and for this reason this gas is usually discarded.

The hydrogen-enriched gas leaving separator 48 is warmed in exchanger 46 to a temperature of about −288° F. and expanded in turbo-expander 52 to a pressure of about 440 p.s.i.g. The remaining minor portion of the refrigeration required by the process is produced in this second expansion which delivers about 11% of the total horsepower generated by the process. The expanded gas after passing through exchangers 30, 11 is recovered from line 54 as product gas at a pressure of 425 p.s.i.g. and a temperature of about 35° F. The product gas has a composition, expressed in percentage by volume:

Hydrogen _____ 90.79
Nitrogen _____ 8.24
Argon _____ 0.47
Methane _____ 0.50

It is well to note that in the foregoing operation 90% of the ammonia originally present in the purge gas supplied to line 10 is recovered at line 20 and 96% of the hydrogen is recovered at line 54 while the total rejection of argon and methane at lines 43, 50 is 90%. Comparing the compositions of the feed or purge gas and the product hydrogen-enriched gas, it is clear that the purge gas contains 10.29% by volume of argon, methane and ammonia which are inert gases with respect to further ammonia synthesis whereas the product gas of this process contains only 0.97% by volume of inert gases and therefore is valuable as recycle gas to the ammonia synthesis operation.

Those skilled in the art will visualize many other modifications and variations of the invention set forth hereinbefore without departing from its spirit and scope. For instance, liquid ammonia withdrawn from separator 19 may, after reducing the pressure thereon, be passed in countercurrent heat exchange relation to the purge gas in order to transfer thereto the cold content of the ammonia. Also, the work performed by turbo-expander 23 may be utilized to increase the pressure of a gaseous stream of the process such as the fuel gas of line 43 with a centrifugal compressor coupled directly to turbo-expander 23. Likewise, a portion of the hydrogen-enriched product gas of line 50 may replace the fuel gas passed through heater 36 to strip adsorbed ammonia from adsorbers 27A, 27B. Accordingly, the claims should not be interpreted in any restrictive sense other than that imposed by the limitations recited within the claims.

What is claimed is:

1. A process for the recovery of ammonia and hydrogen-enriched gas from ammonia synthesis purge gas at high pressure containing nitrogen, methane and argon as other components thereof, which comprises cooling said purge gas to a temperature close to but above the freezing point of ammonia to effect condensation of ammonia, separating ammonia condensate from the cooled purge gas and recovering said ammonia condensate, thereafter expanding said purge gas to an intermediate pressure with the performance of work to produce part of the refrigeration required by said process, passing the expanded purge gas in contact with an adsorbent adapted to remove therefrom at least a major portion of the residual ammonia, further cooling said purge gas after the adsorption of ammonia, therefrom to effect condensation of at least about 80% of said methane and argon in said purge gas, separating the condensed methane and argon from the further cooled purge gas, reducing the pressure of the separated methane and argon condensates and passing the resulting vapors in countercurrent heat exchange relation to said purge gas during said further cooling and said cooling of said purge gas, expanding the hydrogen-enriched gas remaining after said methane and argon condensates have been separated from said further cooled purge gas, the expansion of said hydrogen-enriched gas being carried out with the performance of work to produce the remainder of the refrigeration required by said process, passing the expanded hydrogen-enriched gas in countercurrent heat exchange relation to said purge gas during said further cooling and said cooling of said purge gas, and finally recovering said hydrogen-enriched gas.

2. The process of claim 1 wherein said further cooling of said purge gas is conducted in two stages with an intermediate separation of condensate containing the major portion of the methane originally present in said purge gas, the pressure on the separated condensate is reduced, and the resulting vapor is passed in countercurrent heat exchange relation to said purge gas during the first stage of said further cooling.

3. The process of claim 2 wherein at least part of said vapor from the intermediately separated condensate, after passing in countercurrent heat exchange relation to said purge gas, is heated and passed in contact with said adsorbent, after it has adsorbed ammonia from said purge gas, to strip the adsorbed ammonia from said adsorbent.

4. The process of claim 1 wherein said purge gas is supplied to said process at a pressure of at least about 2000 p.s.i.g. and said hydrogen-enriched gas is recovered at a pressure of at least about 100 p.s.i.g.

5. The process of claim 4 wherein the expansion of said purge gas produces at least 80% of the refrigeration required by said process.

6. A process for the recovery of ammonia and hydrogen-enriched gas from ammonia synthesis purge gas at high pressure containing nitrogen, methane and argon as other components thereof, which comprises cooling said purge gas sufficiently to condense ammonia without freezing the ammonia condensate, separating said ammonia condensate from the cooled purge gas and recovering said ammona condensate, thereafter expanding said purge gas to an intermediate pressure with the performance of sufficient work to produce substantially all of the refrigeration required for the aforesaid condensation of ammonia, removing residual ammonia from the expanded purge gas, further cooling said purge gas after the removal of residual ammonia therefrom to effect condensation of at least 80% of said methane and argon in said purge gas, separating the condensed methane and argon from the further cooled purge gas, reducing the pressure of the separated methane and argon condensates and passing the resulting vapors in countercurrent heat exchange relation to said purge gas during said further cooling and said cooling of said purge gas, expanding the hydrogen-enriched gas remaining after the separation of said methane and argon condensates from said further cooled purge gas, the expansion of said hydrogen-enriched gas being carried out with the performance of sufficient work to produce the remainder of the refrigeration required by said process, passing the expanded hydrogen-enriched gas in countercurrent heat exchange relation to said purge gas during said further cooling and said cooling of said purge gas, and finally recovering said hydrogen-enriched gas.

7. The process of claim 6 wherein the major portion of the separated methane condensate is recovered as fuel gas after the resulting vapor from said major portion has passed in countercurrent heat exchange relation to said purge gas.

8. The process of claim 7 wherein at least part of said fuel gas is heated and passed in contact with adsorbent, which has been used to remove residual ammonia from said expanded purge gas, to strip the adsorbed ammonia from said adsorbent.

9. The process of claim 6 wherein said purge gas is supplied to said process at a pressure of at least about 2000 p.s.i.g. and said hydrogen-enriched gas is recovered at a pressure of at least about 100 p.s.i.g.

10. The process of claim 6 wherein at least about 90% of the methane and argon in said purge gas are condensed and separated and the remaining hydrogen-enriched gas contains at least about 95% of the hydrogen in said purge gas.

11. The process of claim 10 wherein said purge gas is supplied to said process at a pressure of at least about 2000 p.s.i.g. and said hydrogen-enriched gas is recovered at a pressure of at least about 100 p.s.i.g.

12. The process of claim 6 wherein at least about 90% of the ammonia in said purge gas is recovered and said hydrogen-enriched gas contains at least about 95% of the hydrogen in said purge gas.

References Cited

UNITED STATES PATENTS

| | | | |
|---|---|---|---|
| 2,993,342 | 7/1961 | Koble | 62—38 |
| 3,257,812 | 6/1966 | Shaievitz | 62—18 |
| 3,363,428 | 1/1968 | Charlesworth | 62—23 |
| 3,433,027 | 3/1969 | Charlesworth | 62—23 |

NORMAN YUDKOFF, Primary Examiner

A. F. PURCELL, Assistant Examiner

U.S. Cl. X.R.

62—38, 39, 22, 23; 23—198